United States Patent [19]

Mistopoulos et al.

[11] Patent Number: 5,651,578
[45] Date of Patent: Jul. 29, 1997

[54] FOUR SIDED FLUSH SEALING SYSTEM WITH ARTICULATABLE PILLAR

[75] Inventors: James E. Mistopoulos, Saline; Robert A. Vaughan, Dearborn; Karl Deline, Romulus, all of Mich.

[73] Assignee: The Standard Products Company, Cleveland, Ohio

[21] Appl. No.: 427,885

[22] Filed: Apr. 26, 1995

[51] Int. Cl.⁶ ............................................. B60J 10/06
[52] U.S. Cl. ................ 296/146.9; 49/449; 296/146.16; 296/201
[58] Field of Search ............................. 296/146.2, 146.3, 296/146.9, 93, 146.15, 146.16, 201, 224; 49/440, 441, 449, 475.1

[56] References Cited

U.S. PATENT DOCUMENTS

| | | | |
|---|---|---|---|
| 4,043,590 | 8/1977 | Pizzuti | 296/224 X |
| 4,249,770 | 2/1981 | Hunt | 296/224 X |
| 4,653,802 | 3/1987 | Watanabe et al. | 296/146.2 X |
| 4,788,794 | 12/1988 | Miller | 49/214 |
| 4,949,507 | 8/1990 | Vaughan | 49/482 |
| 4,956,941 | 9/1990 | Vaughan | 49/440 |
| 5,054,242 | 10/1991 | Keys et al. | 49/491 |
| 5,095,655 | 3/1992 | Warren | 49/374 |

FOREIGN PATENT DOCUMENTS 52-18629  2/1977  Japan ........................... 296/146.2

*Primary Examiner*—David M. Mitchell
*Assistant Examiner*—Kia M. Robinson
*Attorney, Agent, or Firm*—Harness, Dickey & Pierce, P.L.C.

[57] ABSTRACT

The present invention relates to a four sided flush weatherstrip sealing system, and more particularly, to a weatherstrip sealing system including one or more latching mechanisms which selectively grasp the glass window panel and bring the panel into enhanced engagement with the weatherstrip sealing assembly. Also provided are improved sealing arrangements for the window panel along the vehicle door rear view mirror and the B pillar portion located below the vehicle door belt-line.

34 Claims, 6 Drawing Sheets

FOUR SIDED FLUSH SEALING SYSTEM WITH ARTICULATABLE PILLAR

BACKGROUND OF THE INVENTION

The present invention relates to a weatherstrip system and, more particularly, to a weatherstrip system that, when positioned on a vehicle, provides the vehicle windows with a peripheral flush appearance with the vehicle body.

In the automotive industry, it is desirous to have moveable windows which are flush with the vehicle body roof, door and side pillars. This flushness, while providing an aesthetic appearance, also provides aerodynamic characteristics and reduced drag. When providing moveable windows that are peripherally flush with the vehicle body, the sealing of the windows must be taken into consideration.

Heretofore, door assemblies have been provided in which a moveable door window is carried by the door assembly in a substantially flush arrangement with the door outer body structure of the vehicle along four sides when the window is in a closed position. One such arrangement is shown in U.S. Pat. No. 4,575,967 which illustrates a bent window and guide track arrangement including outwardly directed fixed sections which cause the window to be moved outwardly as it approaches the closed position to a substantially flush position at the exterior panel of the door and along the top and sides of the door frame. To accomplish this window arrangement, a pair of lower pin guides adjacent the lower end of the window and a third pin disposed along the top side edge of the window are required for stabilizing the window in the closed position. With this type of window assembly and many other so-called flush glass sealing systems, it is a perceived drawback that over time the window panel no longer seats flushly against the weatherstrip seating members along all sides of the window.

Accordingly, the present invention provides the art with a weather-strip sealing system for moveable vehicle window panels which enable the window panel to be flush about the periphery with the vehicle body and remain in such a condition. This flush condition is accomplished with the assistance of a latching system which essentially grasps the vehicle door window panel as it approaches a fully closed position and pulls the window panel inwardly into enhanced engagement with the weatherstrip sealing system along the side pillars and header portion.

Generally, a pair of spaced apart guide channels as is known in the art are disposed below the belt-line of the door assembly which slidably receives the window sash mounted along the lower edge of the window. During movement of the window between open and closed positions within the window opening, the guide channels direct the window assembly along the track. Preferably, the window panel itself is slightly concave such that the exterior surface of the window is maintained substantially flush with the exterior surface of the door assembly.

To accomplish the objective of providing a weatherstrip sealing system with enhanced sealing qualities, particularly along the corners of the window panel, the weatherstrip system of the present invention includes, in addition to a unique weatherstrip system, latching mechanisms which engage latches provided along the top edge of the window panel and pull the panel inwardly toward the window opening. Thus, not only is the weatherstrip sealing arrangement believed to be unique and an improvement over existing systems, but also the latching mechanism is considered to be a further advancement in the art. In addition, a seal sub-assembly is provided which is disposed between the vehicle door mirror and the forward lateral edge of the window panel and extends between the A pillar and belt-line. Lastly, the weatherstrip assembly includes a support seal which is disposed below the vehicle door belt-line along the B pillar. Typically, this portion of the vehicle door is the most difficult area to effectively seal.

It is thus the primary object of the present invention to provide an improved weatherstrip sealing system for a four-sided flush glass seal arrangement which effectively seals the window panel along all edges.

It is another object of the present invention to provide a weatherstrip seal assembly which includes latching mechanisms to draw the vehicle door window inwardly to tightly engage the weatherstrip seal assembly disposed along the vehicle door window opening.

Yet another object of the present invention is to provide a first sealing sub-assembly about the vehicle door rear view mirror.

Still another object of the present invention is to provide a weatherstrip seal portion which effectively seals along the base of the articulating B pillar.

Other advantages of the present invention will become readily apparent by reference to the following description of the preferred embodiments taken in conjunction with the attached drawings and the appended claims.

DETAILED DESCRIPTION OF THE PREFERRED EMBODIMENT

Figure 1:
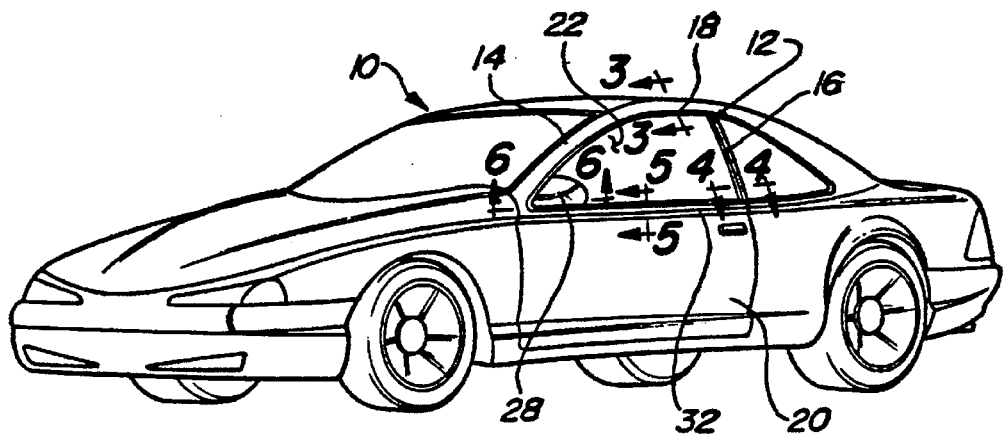
FIG. 1 is a side-elevational view of an automotive vehicle embodying a four-sided flush glass sealing system in accordance with the teachings of the present invention.

Referring to FIG. 1, an automotive vehicle 10 including a vehicle body structure which defines an opening for receiving a door is provided. The vehicle 10 generally includes A and B pillar portions 14 and 16, respectively, which are separated along the top by a header portion 18. The vehicle door 20 typically includes a moveable slightly convex panel of window glass 22 which is raised and lowered within the window opening and is capable of being closed to a substantially flush position along all sides of the window panel as indicated in FIG. 1.

Figure 2:
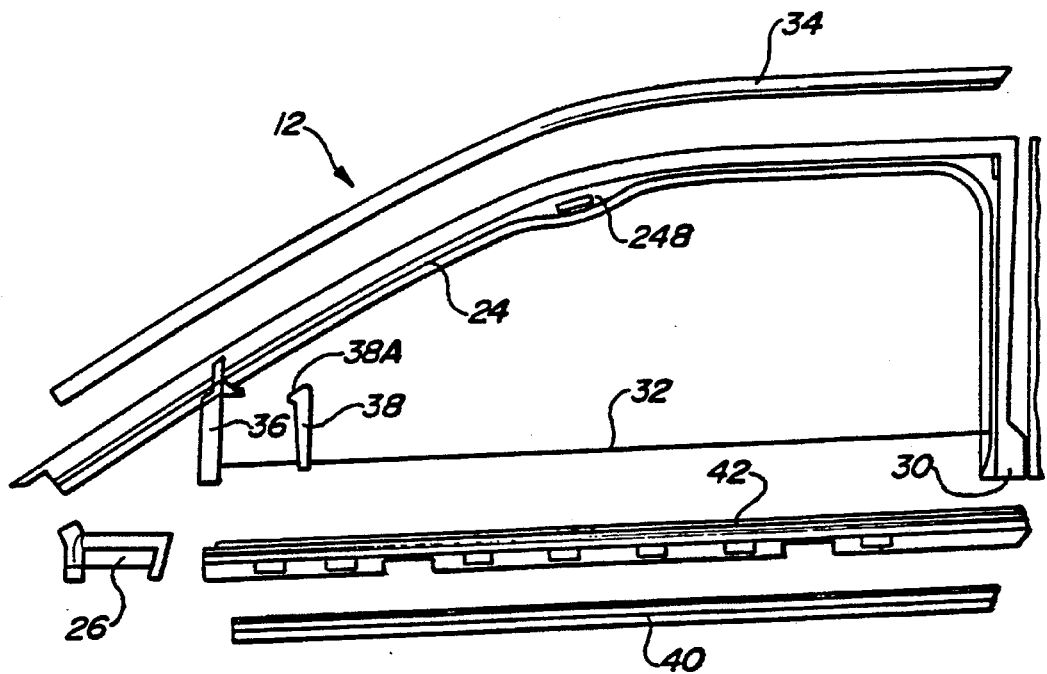
FIG. 2 is a blown out side-elevational view of the various components which comprise the four-sided flush glass sealing system of the present invention.

Referring to FIG. 2, many of the components which are combined to form the overall flush glass window sealing system 12 of the present invention are shown in a blown out side elevational view. As will be described in greater detail below, the major components of the four-sided flush glass sealing system include a continuous weatherstrip 24 which is mounted along the A and B pillar portions as well as the header portion. The weatherstrip includes a separate and distinct tail portion 26 that interfaces with the molded detail of weatherstrip 24 located along a first end which assists in sealing along the rear view mirror 28 otherwise referred to herein as a sail, as seen in FIG. 1. By interfaces, it is meant that the weatherstrip 24 and tail 26 come into direct contact when the vehicle door is closed, thereby creating an effective seal to prevent air from rushing in at the forwardmost edge of the vehicle door (i.e. at the intersection of the A-pillar, sail and belt-line).

A second end 30 of the weatherstrip 24 includes a specific sealing structure which mates with the sealing strip as will be described in greater detail below. This continuous weatherstrip 24 is secured along the A and B pillar portion as well as the header portion of the vehicle door opening by an extending C-shaped channel 34 which is fastened to the vehicle door opening through the use of mechanical fasteners or adhesives.

Also illustrated in FIG. 2 are first and second elements 36 and 38, respectively, which form part of a weatherstrip sub-assembly for sealing the window panel along the vehicle door rear view mirror or sail and a modified bracket member 40 carried by the inner door panel along the belt-line 32 which maintains the belt weatherstrip 42 upon attachment. Reference will now be made to FIGS. 3–8 which more clearly depict the flush glass weatherseal sealing system along various sections of the vehicle door opening and the belt-line of the vehicle door.

Figure 3:
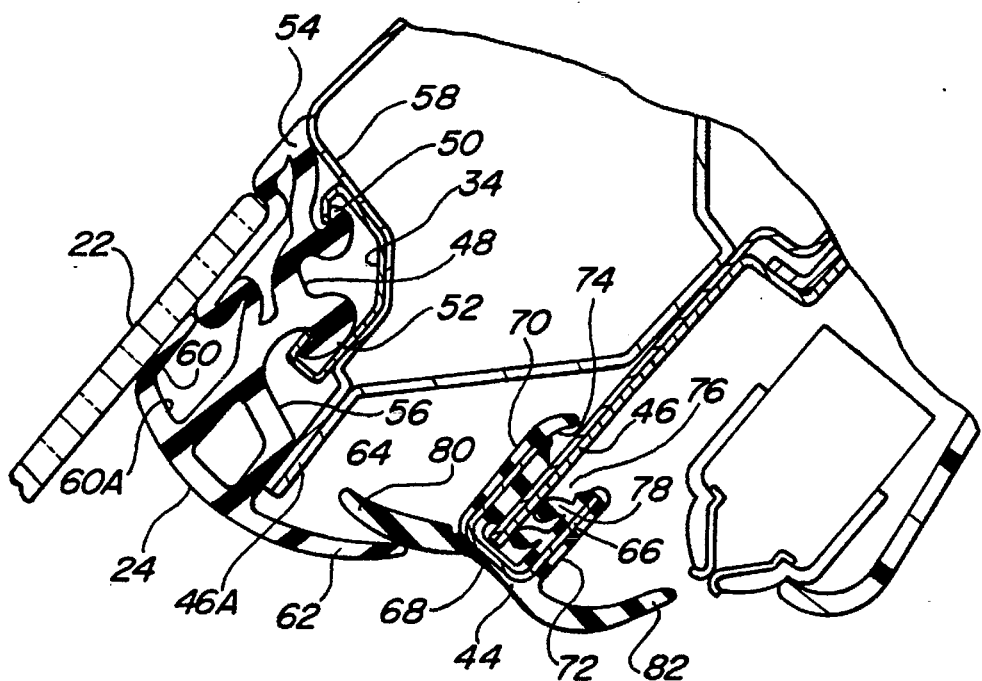
FIG. 3 is a sectional view taken along line 3—3 of FIG. 1 illustrating the flush glass sealing system of the present invention mounted along the header portion of the vehicle door assembly.

Referring specifically to FIG. 3 a sectional view taken along line 3—3 of FIG. 1 is provided which illustrates the flush glass sealing assembly 12 according to the teachings of the present invention mounted along the header portion 18 of the vehicle body side. Typically, the flush glass weatherstrip sealing system is disposed along the header portion includes the outer weatherstrip 24 which is maintained along the vehicle door opening by the C-shaped channel 34 which extends continuously along the length of the A pillar and header portions. Also provided is an inner weatherstrip 44 which is mounted to an extending flange 46 of the vehicle door opening frame. The outer weatherstrip 24 includes a web portion 48 having first and second ribs 50 and 52, respectively, extending oppositely along each end of the web which seat within the C-shaped channel 34 to maintain attachment of the outer weatherstrip. The outer weatherstrip 24 also includes a first compressible sealing bulb 54 extending outwardly away from the web portion 48 and a second sealing bulb 56 extending downwardly from the web portion and integrally connected to the first sealing bulb. Ideally, the first sealing bulb 54 seats against the body side panel 58 to provide a tight seal along the header portion regardless of whether the window panel is in an up or down position within the window opening. The second sealing bulb 56 is preferably provided with first and second substantially transversely extending accurately disposed legs 60 and 62, respectively, the first of which is contacted by the panel of window glass 22 when the panel is maintained in a raised or closed position. Further, extending leg 60 when fully extended provides a means 60A in the form of a reservoir for precluding water from advancing into the window opening.

The inner weatherstrip 44 includes a substantially U-shaped rigid metallic core 66 including a web 68 and first and second legs 70 and 72, respectively. Disposed along the inner surface 74 of the U-shaped channel 76 are a plurality of fingers 78 which assist in maintaining the inner weatherstrip over the flange 46. Extending outwardly along each end of the web portion are first and second sealing ribs 80 and 82. Ideally the second leg 62 of bulb portion 56 and the first rib 80 of the inner weatherstrip are positioned such that they could at least partially overlap, thus allowing for additional variation between flange 46 and seal 24. Thus, legs 80 and 62 assist in closing the variable gap created between flanges 46 and 46a along the weatherstrip 44 proximate to the grommet 248 as shown in FIG. 2.

Figure 4:
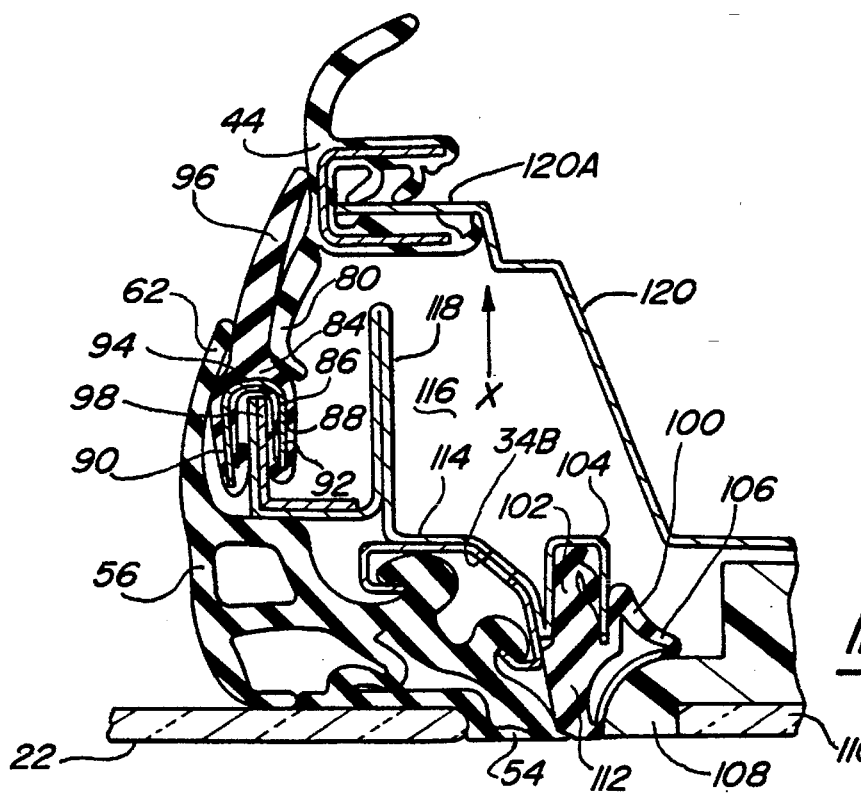
FIG. 4 is a sectional view taken along line 4—4 of FIG. 1 illustrating the flush glass sealing system of the present invention mounted along the B pillar portion of the vehicle door assembly in an articulated position.
Figure 4A:
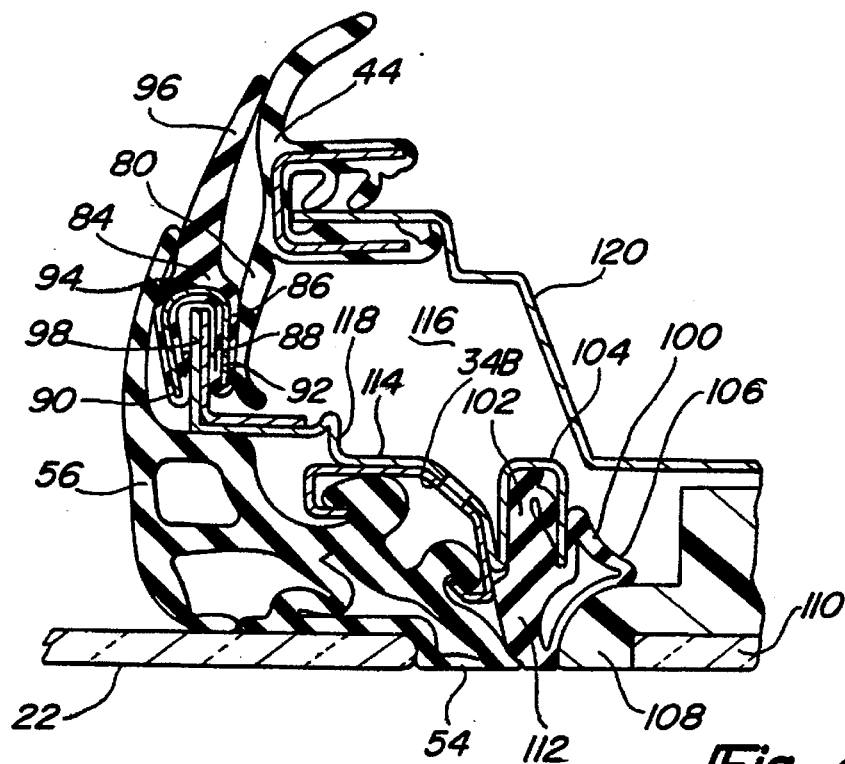
FIG. 4A is a sectional view taken along line 4—4 of FIG. 1 illustrating the flush glass sealing system along the B-pillar portion shown in an unarticulated position.

Referring to FIG. 4, a sectional view taken along line 4—4 of FIG. 1 illustrating the flush glass weatherstrip sealing system 12 of the present invention mounted along the articulating B pillar portion 16 of vehicle door opening assembly is provided. In addition to the inner and outer weatherstrips 24 and 44, respectively, as described with reference to FIG. 3, a third weatherstrip 84 having a substantially U-shaped channel 86 defined by a metallic core 88 which includes first and second legs 90 and 92 separated by a web portion 94 is provided along the B pillar portion. This third weatherstrip 84 includes elastomeric covering disposed over the U-shaped channel portion having an elongated leg 96 which extends from the web portion. Generally, the weatherstrip 84 is disposed over a pinchweld flange 98 provided on the B pillar such that the elongated leg 96 separates the second leg 62 of the bulb portion 56 and the first leg 80 of the inner seal portion 44. The Weatherstrip 84, thus, assists in closing the gap created between the flange 120 A located along the terminal end of inner panel frame 120 and the panel of window glass 22, since their spacing relationship changes (i.e. becomes more dramatic) approaching the belt-line 32.

Additionally, a fourth weatherstrip 100, having a retaining feature 102 otherwise referred to herein as a stem or rolling key, is provided, wherein the retaining feature extends into a U-shaped channel 104 of the roll formed frame 114 along the B-pillar portion. The weatherstrip 100 also includes a bulb 106 which engages the vertically extending column 108 which anchors the rear quarter window 110 in place. Thus, the outer weatherstrip 24, third weatherstrip 84, fourth weatherstrip 100 and C-shaped channel 34B as illustrated in FIG. 4 are assembled to the roll formed frame 114 to create the articulating B-pillar assembly. As indicated by the arrow designated by reference character X, as the B-pillar assembly is articulated along the lower end thereof such that flange 118 draws closer to flange 120A, leg 96 of weatherstrip 84 slides over the outer surface of weatherstrip 44 providing additional sealing characteristics and closing off the gap 116 created to necessitate articulation of the B-pillar assembly in an aesthetically pleasing manner.

In order to cycle the panel of window glass 22 from a fully closed position to an at least partially open or down position and further enabling the vehicle door to be opened, the B-pillar assembly consisting essentially of weatherstrip 24, weatherstrip 84, weatherstrip 100, C-shaped channel 34B and frame 114 must be articulated inwardly toward the center of the vehicle as illustrated by arrow X in FIG. 4. This in turn allows the panel of window glass 22 to follow the downward path of the window regulator (not shown) and into the door. By reversing the aforementioned steps, the panel of window glass can be returned to a fully closed position. Likewise, when closing the vehicle door with the panel of window glass in a full up position, the B-pillar portion including the panel 22 and column 108 along the rear quarter window become fully sealed which in turn allows for latching of the panel of window glass 22.

Figure 5:
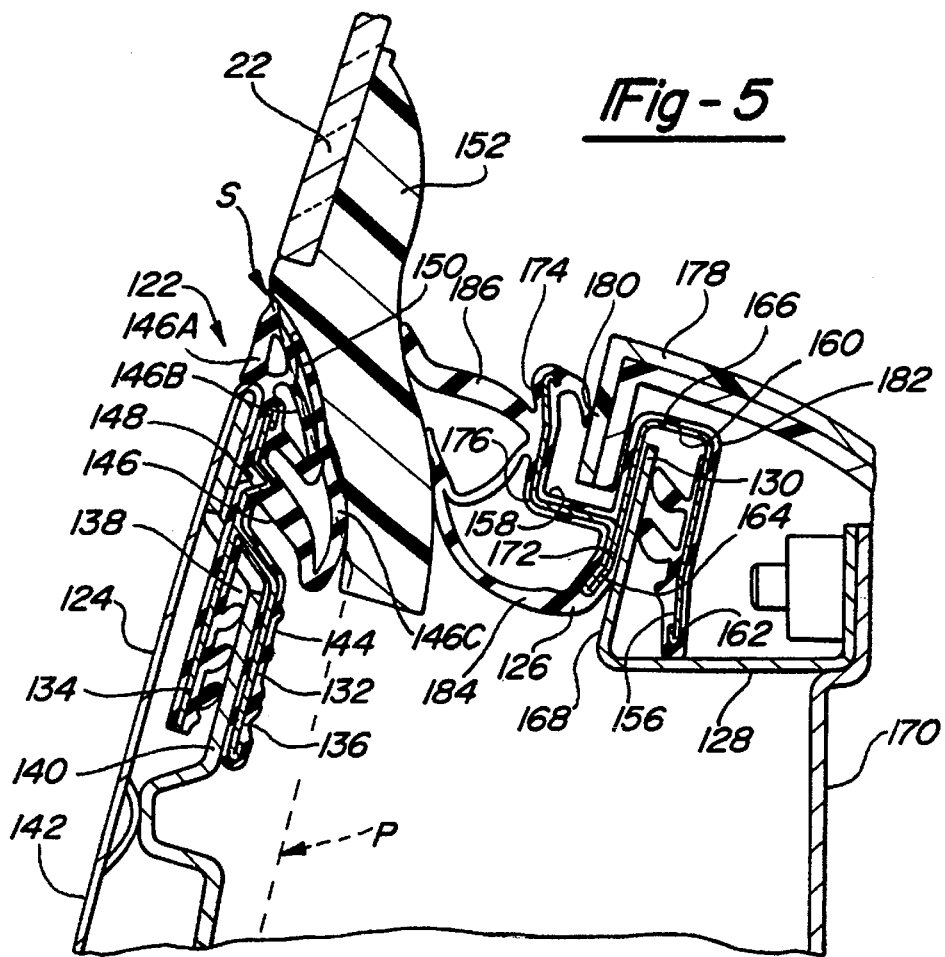
FIG. 5 is a sectional view taken along line 5—5 of FIG. 1 illustrating the flush glass sealing system of the present invention mounted along the belt-line portion of the vehicle door assembly.

Referring to FIG. 5, a sectional view taken along line 5—5 of FIG. 1 illustrating the flush glass weatherstrip sealing system of the present invention mounted along the belt line portion 32 of the vehicle door assembly 20 is provided. The weatherstrip sealing assembly 12 as illustrated along the vehicle door belt line 32 includes a belt weatherstrip 122 which is generally mounted over the outer door panel 124 and a second spaced apart inner weatherstrip seal 126 which is attachable over the outermost leg 130 of the U-shaped spacing bracket 128 which extends from the inner panel 170 of the vehicle door. The belt line weatherstrip 122 includes a metallic core 132 having a plurality of first elongated legs 134 which are punch formed from a second substantially L-shaped leg 136 providing a U-shaped channel 138 therebetween which is mounted over a flange 140 provided on the outer door panel 142. The metallic core is preferably coated with an extruded layer of elastomeric material 144. A similar belt-line weatherstrip 122 structure is illustrated in other United States Patents assigned to The Standard Products Company.

Additionally, a sealing bulb 146 is provided which is disposed at the end of the elongated first leg 148 opposite the U-shaped channel to provide a sealing arrangement between the outer panel 142 and the sash plate 152 when the window is in a closed position. The sealing bulb 146 includes first, second and third sections 146A, 146B and 146C which are cooperatively compressible as the window is raised to a closed position within the window opening. A wiping lip 150 which extends from the sealing bulb is also provided which engages the window panel 22 when the panel is cycled and seats against the sash plate 152 mounted along the bottom edge of the panel of window glass when the panel is in a fully closed position.

The inner weatherstrip seal 126 provided along the vehicle door belt line includes a metallic core 156 having an overall S-shape to provide first and second oppositely disposed substantially U-shaped channels 160 and 158, respectively. The first U-shaped channel 160 of the inner seal includes first and second elongated legs 162 and 164 which are separated by a web portion 166 such that the U-shaped channel 160 can be mounted over the outermost leg 130 of the bracket member 128. The second U-shaped channel 158 includes a first leg 164 which is shared with the first U-shaped channel and a second leg 174 separated from the first leg by a web portion 176. The second U-shaped channel 158 is generally shorter in length then the first U-shaped channel of the inner seal. Typically, a trim piece 178 which is accessible to the view of the individuals within the passenger compartment of the vehicle includes a downwardly extending leg 180 disposed within the second U-shape channel. An elastomeric coating 182 is also provided over the substantially S-shaped metallic core and includes a bulb portion 184 extending from the shared leg 164 and the outer second leg 174 of the second U-shaped channel 158. Also extending from the second leg 174 of the second U-shaped channel 158 is a wiping lip 186 which engages the inner surface of the window panel or the window sash depending upon whether the window in an open or closed position.

It should be clear to those skilled in the art that the panel of window glass is adapted to be moved between an open and closed position by any one of a number of window regulating mechanisms as are known in the art. Typically, such window regulating mechanisms include gear sectors, regulator arms and rollers which are received within guide tracks and secured to the sash plate. For example, to cycle the panel of window glass from a fully open or down position to a fully closed or up position, and with the B-pillar assembly fully articulated toward the center of the vehicle door panel as previously described, the glass panel is moved upwardly and outwardly along a predetermined path as illustrated in FIG. 5 by the dot and dashed line designated by reference character P via a regulator mechanism (not shown) contained within the door panel. The sash 152 follows a predetermined path as defined by the regulator tracks (not shown) contained within the door panel. When the panel of window glass 22 and the sash 152 reach the full up position, the wiping lip 150 is folded against the bulbs 146A, 146B and the bulb 146C is compressed creating a seal between outer panel 142 and sash 152. The bulb 146A which is compressible creates the margin between the door outer panel 142 and point designated by reference character S on the window sash 152 and provides for the desired flush condition along the belt-line. It is at this point, i.e. when the panel of window glass is in the full-up position and sealed along the belt-line, that the B-pillar articulates such that latching of the window is accomplished as previously described.

Figure 6:
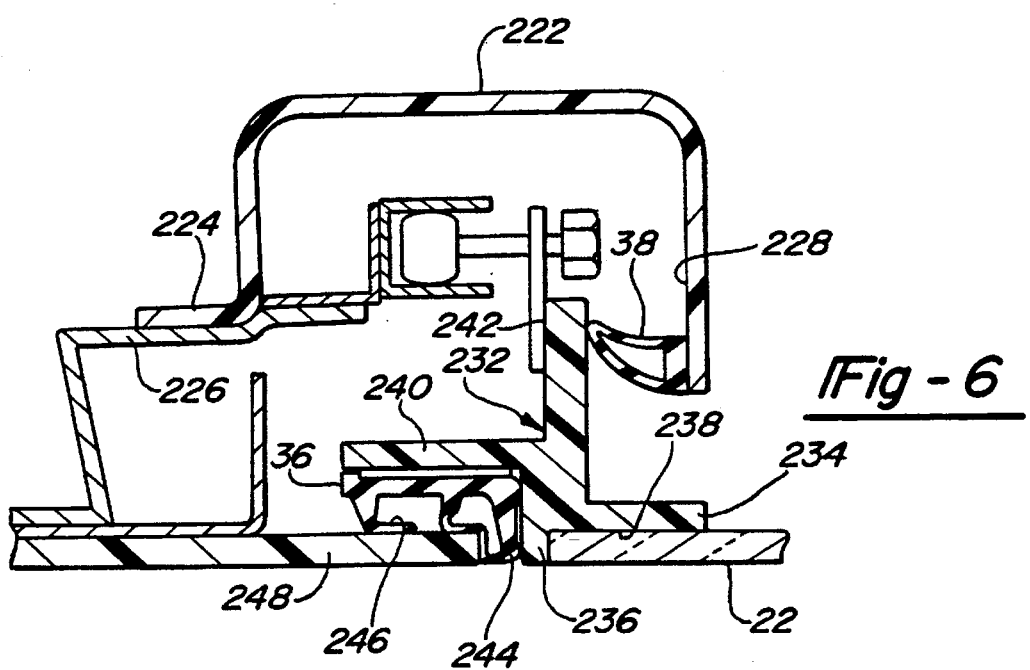
FIG. 6 is a sectional view taken along line 6—6 of FIG. 1 illustrating the sealing arrangement along the rear view mirror of the vehicle door extending between the A pillar and belt-line portions of the vehicle door assembly.

Referring to FIG. 6, a sectional view taken along line 6—6 of FIG. 1 illustrating the sealing sub-assembly extending between the A pillar and belt line portions of the vehicle door assembly to effectively seal along the mirror of the vehicle door is provided. Generally, the sealing sub-assembly located proximate to the mirror 28 includes a substantially U-shaped inner trim panel 222 fastened along a first end 224 to the inner panel 226 of the vehicle door. Along a second end 228 of the trim panel 222, the sealing element 38 is attached to the inner surface thereof such that the protuberance 38A illustrated is FIG. 2 extends in the direction of the first end 224 of the trim panel. Preferably, the sealing element 38 is tapered downwardly from top to bottom as shown in FIG. 2 to assist in sealing the window panel as it is raised into a full up and outward position.

Adhesively attached to the inner surface and lateral edge 230 of the forward portion of the window panel is a guide rim 232. The guide rim 232 includes a plurality of radially extending legs 234, 236, 240 and 242, respectively. The window panel 22 is mounted to the guide rim 232 along a recess 238, a recess 238 formed at the intersection of first and second elongated legs 234 and 236, respectively. The guide rim has a modified cross-shape as shown in FIG. 6 wherein the first leg 234 extends in the opposite direction of the third leg 240 and the second leg 236 extends in the opposite direction as the fourth leg 242. Sealing element 36 is typically adhesively attached to the third leg 240 such that the sealing bulb 244 and sealing lip 246 of sealing element 36 engage the mirror plate 248 when the window panel is at least partially closed. Likewise, when the window panel is in a raised position, the first sealing element 38 is compressed by leg 242 of the guide rim.

Figure 7:
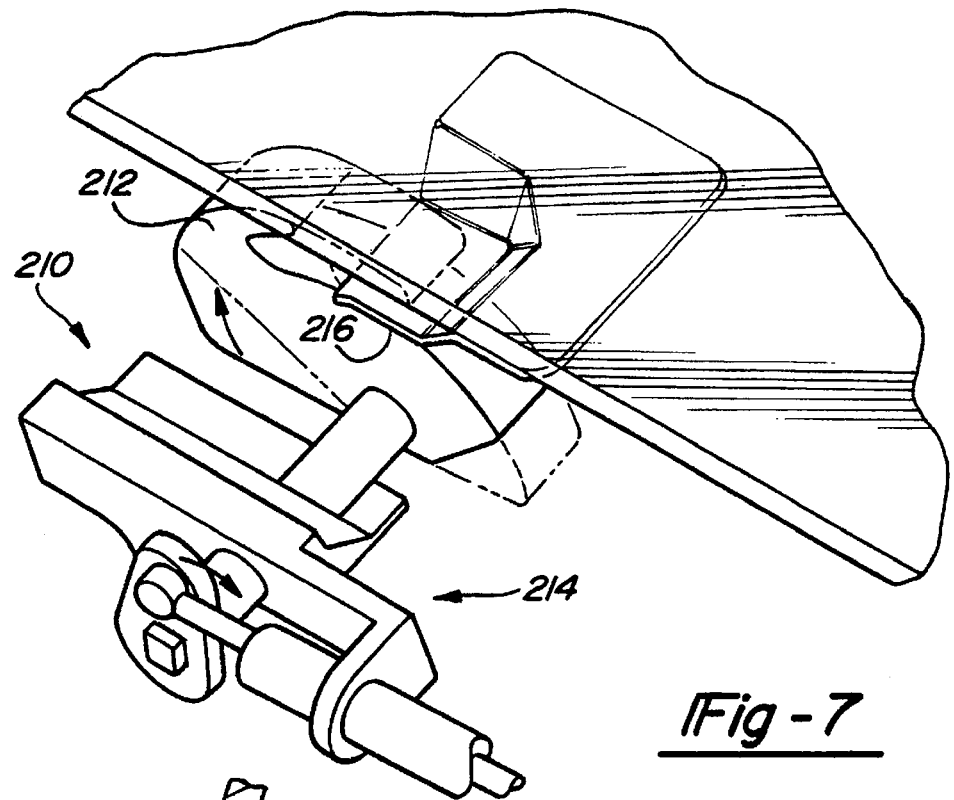
FIG. 7 is a perspective view of a general latching mechanism useful for coupling the panel of window glass.

Referring to FIG. 7 a perspective view of a general latching mechanism 210 useful for coupling the panel of window glass is provided. The latching mechanism 210 typically includes a partially rotatable hook portion 212 and means 214 for actuating the hook portion to engage and disengage the latch 216 which is permanently attached to the panel of window glass proximate to the header and B pillar portions. The means for actuating the hook portion preferably rotates the hook to both engage the latch and pull the panel of window glass inwardly to more tightly engage the weatherstrip sealing system along the A and B pillar as well as the header portion.

Figure 9:
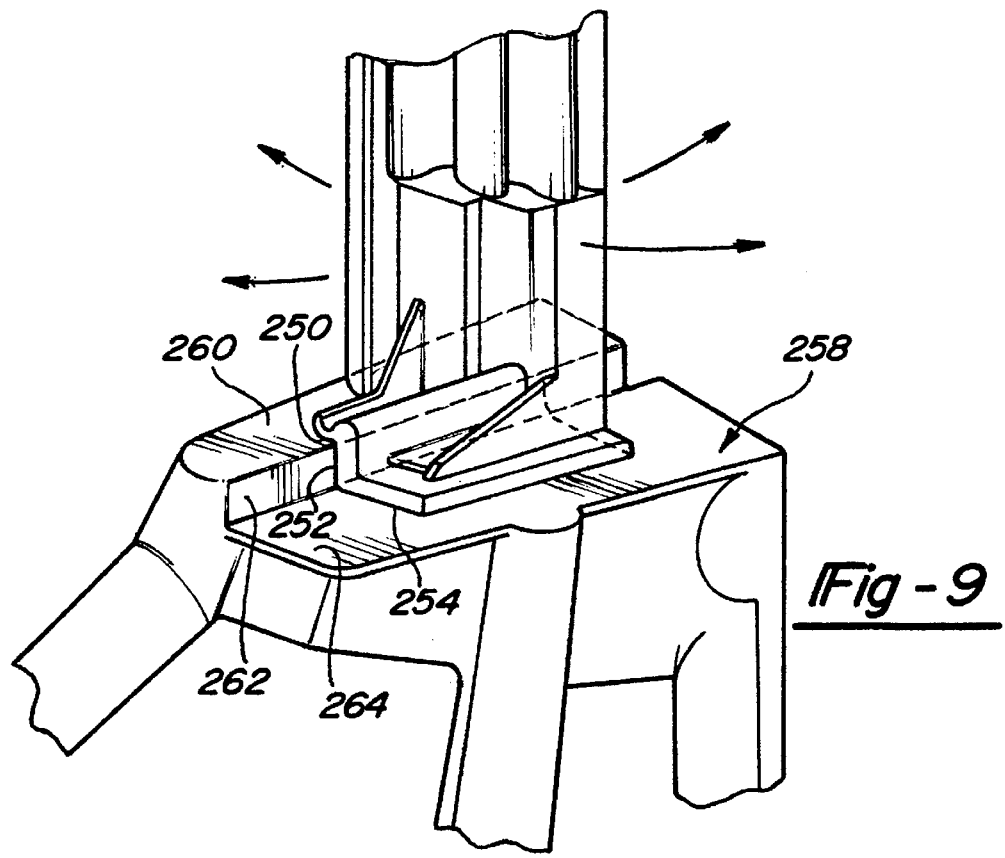
FIG. 9 is an elevational view illustrating the sealing arrangement located along the terminal end of the B-pillar portion below the belt-line.

Ideally, the window sealing system of the present invention also includes a modified sealing arrangement along the terminal or second end 30 of the B-pillar portion located at the belt-line. As illustrated in FIG. 9, the second end 30 of the weatherstrip has a terraced construction including a relatively flat, generally horizontally disposed surface 250, a vertically disposed transition portion surface 252 and a second substantially horizontally disposed surface 254. Similarly, the vehicle door sealing strip 258, which is generally disposed along the door panel at the belt-line, includes a first substantially horizontally disposed landing surface 260, a second substantially vertical surface 262 and a third substantially horizontal landing surface 264.

Figure 10:
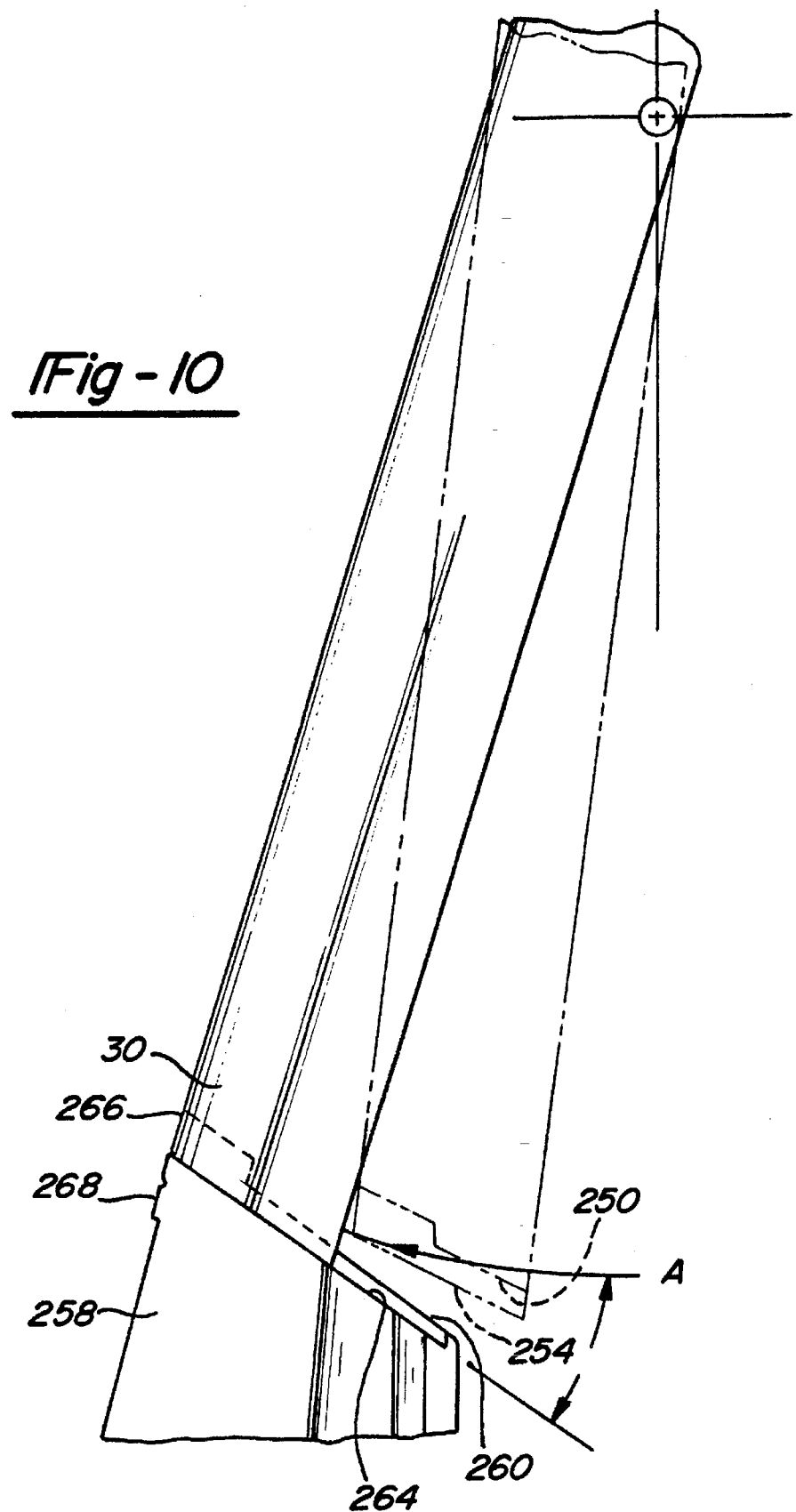
FIG. 10 is an elevational view illustrating the sealing arrangement of FIG. 9 advancing toward a fully sealed position.

The interface intended between end 30 and sealing strip 258 is designed to accommodate a typical vehicle build variation in all directions of up/down, fore/aft and in/out situations with respect to the vehicle door to body relationships. When the door is closed, end 30 and sealing strip 258 come in contact with each other as the B-pillar assembly consisting of 24, 84, 112, 114 and C-channel 34B is articulated outwardly away from the center of the vehicle into a sealing position. As shown most dearly in FIG. 10, the substantially horizontal surfaces 250 and 254 of end 30 are angled slightly open to the path of articulation. Likewise, the substantially horizontal surfaces 260 and 264 of sealing strip 258 are angled slightly open to the path of articulation such that when the B-pillar is articulated into the sealing position as indicated by the arrow designated by reference character A, the opposing surfaces create a compression condition (i.e. surface 250 with surface 260 and surface 254 with 264) allowing the door to body relationship to vary up/down and in/out within certain tolerances, i.e. generally on the order of 5.0 mm or less. The substantially vertical surface 252 of end 30 and the substantially vertical surface 262 of sealing strip 258 are also angled slightly open to the path of articulation such that when the B-pillar is articulated into the sealing position, the opposing surfaces 252 and 262 create a compression condition. By providing this compressed condition along opposing mated surfaces, the sealing arrangement between the terminal end 30 of the weatherstrip 24 and the sealing strip 258 compensate for any variation with respect to the door to body relationship in the fore/aft or in/out position from one vehicle to the next as a result of manufacturing tolerance differentials which normally occur. As illustrated in FIG. 9, the sealing arrangement between the terminal end 30 and the sealing strip 258 is shown approximately half way to its full sealed position. A full sealed, compressed condition would exist when the forward edge 266 of end 30 reaches the forward edge 268 of sealing strip 258 creating a flush condition with the vehicle belt line 32.

As shown most clearly in FIG. 2, a second latching mechanism disposed along the header portion of the automotive vehicle is also provided. The latching mechanism includes an actuable latch member which is housed within the grommet 248 which is attached to the outer weatherstrip 24. After the latching mechanism 210 provided along the B pillar is activated such that the panel of window glass is pulled inwardly, the second latching mechanism is activated causing a slat (not shown) to engage a latch (not shown) adhesively bonded to the inner surface of the window panel along the upper edge, thus securing the window panel in the full up position.

Figure 8:
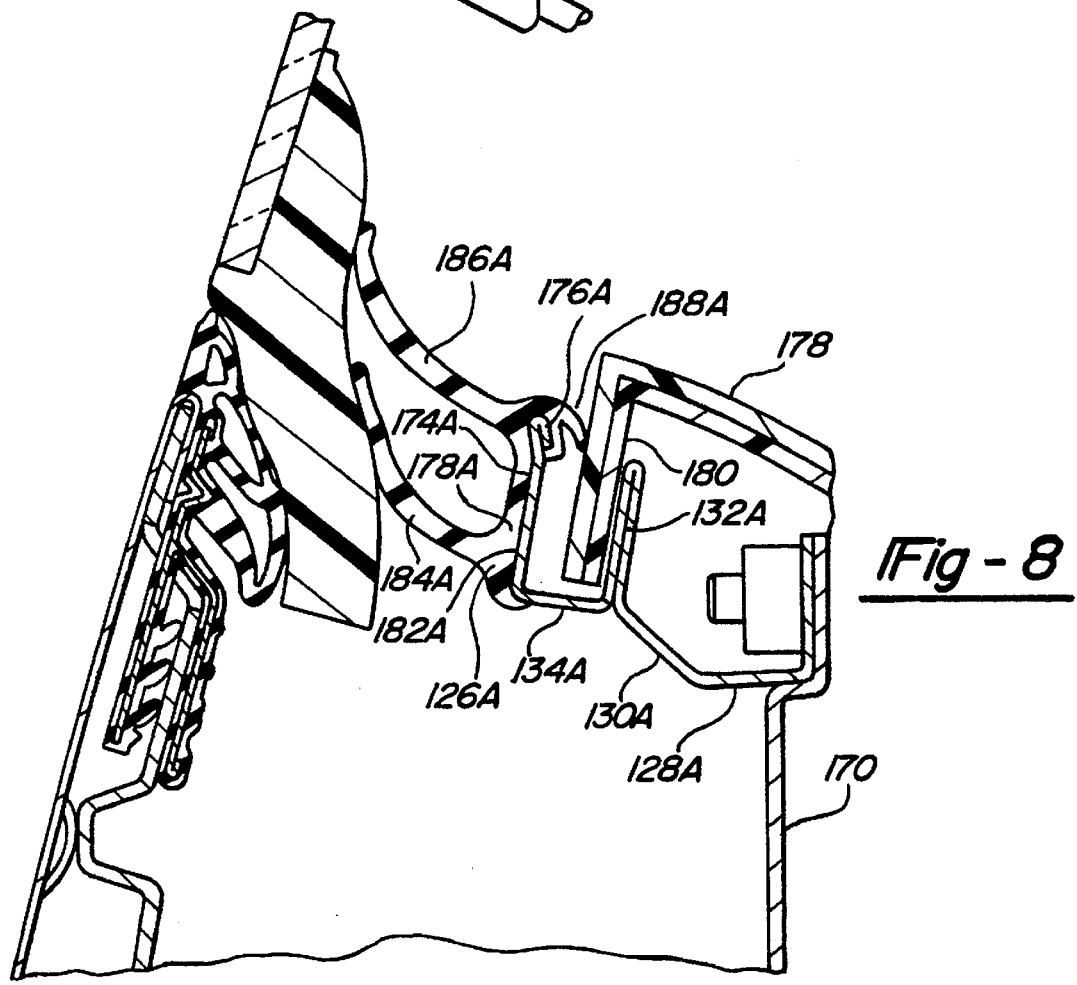
FIG. 8 is a sectional view illustrating an alternative preferred embodiment of the flush glass sealing system of the present invention as mounted along the belt-line of the vehicle.

Referring to FIG. 8, a second embodiment. 126A of the inner weatherstrip seal disposed along the vehicle door belt-line is provided. According to this embodiment, a bracket 128A having two substantially U-shaped portions 130A and 134A is mounted to the vehicle door inner panel through the use of fasteners. The downwardly extending leg 180 of the trim piece 178 is disposed within the second U-shaped channel 134A to seat against the leg 132A shared by both the first and second U-shaped channel portions. The second leg 174A of the U-shaped channel 134A has a reentrantly bent end 176A to assist in maintaining an elastomeric covering 178A over the outer surface 180A of the second leg portion. The elastomeric covering typically includes first and second spaced apart wiping lips extending from the second leg along each end thereof and a rib 188A which extends at the reentrantly bent free end of the second leg to engage the trim piece 178.

The operational aspects of the present invention will now be described in greater detail. When the panel of window glass is in a retracted or partially open position, the latching mechanism is disengaged such that the hook portion is separated from the latch which is adhesively bonded to the inner surface of the window panel. Under this arrangement the window panel is maintained in a substantially vertically disposed position. As the window panel is advanced toward the fully closed position within the window opening, the top portion of the window is tilted inwardly in the direction of the leading portion and the window regulating system (not shown) moves laterally in the direction of the vehicle doors outer panel to allow the top portion of the window panel to move inwardly. This in turn allows the latching mechanism to be activated thereby causing the lock portion to rotatably engage the latch and pull the window pane inwardly to compress the first sealing bulb of the outer weatherstrip.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A weatherstrip sealing system for sealing a window panel of a vehicle door along a window opening, said window panel including top and side edges and a sash along a lower edge and said window opening being defined by at least one pillar and a header portion, said weatherstrip sealing system comprising:

means for sealing the window panel along said window opening; and means for automatically latching said window panel and drawing said panel inwardly toward the window opening into enhanced contact with said means for sealing the window panel, said means for automatically latching said window panel including at least one latching mechanism which is activated to engage a latch extending from an inner surface of said window panel when said window panel is in a sufficiently closed position.

2. The weatherstrip sealing system of claim 1, wherein first and second latching mechanisms are provided, said first latching mechanism being disposed along a first articulatable pillar to selectively engage a first latch located along the window panel and said second latching mechanism being disposed along the header portion to selectively engage a second latch located along the window panel.

3. The weatherstrip sealing system of claim 1, wherein said means for sealing the window panel comprises:

a first weatherstrip including a web portion having first and second oppositely extending ribs which seat within a substantially C-shaped channel located along the window opening and a compressible bulb portion having a first arcuate leg extending toward the window opening which provides a reservoir for precluding water from entering the window opening.

4. The weatherstrip sealing system of claim 3, wherein said means for sealing the window panel further comprises:

a first compressible sealing bulb extending outwardly from said web and a second sealing bulb which extends downwardly from said web, said second sealing bulb including first and second legs extending transversely and oppositely therefrom whereby the first leg engages the window panel when said panel is in an at least partially closed position.

5. The weatherstrip sealing system of claim 4, wherein said means for sealing the window panel further comprises a second weatherstrip disposed inwardly from the first weatherstrip, said second weatherstrip including a substantially U-shaped channel having a first outwardly extending leg which extends from said channel in the direction of said second leg provided on the first weatherstrip, said first outwardly extending leg being sufficiently long to be in contact with the second leg of the first weatherstrip.

6. The weatherstrip sealing system of claim 5, wherein a second leg is provided which extends from said U-shaped channel in a direction substantially opposite that of said first leg.

7. The weatherstrip sealing system of claim 5, further comprising a third weatherstrip disposed along a flange extending from said first articulatable pillar between said first and second weatherstrips, said third weatherstrip including first and second legs separated by a web and a third elongated leg extending from said web, said third leg being sufficiently long so as to remain in contact with the second weatherstrip regardless of the position of said first articulatable pillar.

8. The weatherstrip sealing system of claim 7, further comprising a fourth weatherstrip disposed along said first articulatable pillar, said fourth weatherstrip including a stem which is press fit within a channel provided along the articulatable pillar and a sealing bulb extending from the stem, whereby said sealing bulb serves to provide a seal between the first compressible sealing bulb of the first weatherstrip and a rear quarter window assembly.

9. The weatherstrip sealing system of claim 4, wherein said first weatherstrip includes a terminal end generally occurring along the belt-line extending from said first articulatable pillar which matingly engages a door panel sealing member.

10. The weatherstrip sealing system of claim 9, wherein said terminal end of the first weatherstrip and the door panel sealing member have mating surfaces such that upon the articulation of said articulatable pillar, the mating surfaces come into compressive contact.

11. The weatherstrip sealing system of claim 10, wherein said mating surfaces of the terminal end and said door panel sealing member are angled slightly open to the path of articulation such that contact along the mating surfaces increase as the pillar articulates inwardly.

12. The weatherstrip sealing system of claim 1, further comprising a vehicle door mirror sealing assembly including a mirror mounting plate extending from the outer panel of the vehicle door, said mirror sealing assembly comprising:

an inner trim panel extending from the vehicle door inner panel;

a guide rim bonded along a forward edge of the window panel, which includes a plurality of radially extending legs;

a first sealing element extending between the inner trim panel and a first leg of the guide rim; and a second sealing element extending between a second leg of the guide rim and said mirror mounting plate.

13. The weatherstrip sealing system of claim 1, further comprising a belt weatherstrip assembly including a first belt weatherstrip mountable over the outer panel of the vehicle door, an outwardly extending bracket mountable to the inner panel of the vehicle door to allow for sufficient spacing between said inner and outer door panels to host a window regulator, and a second weatherstrip seal mountable over said bracket to provide for sealing along the inner surface of the window panel.

14. The weatherstrip sealing system of claim 13, wherein said first belt weatherstrip includes a core having first and second spaced apart legs to provide a U-shaped channel and a sealing bulb extending from said first leg which provides a seal between the outer door panel and the window sash extending from the window panel when the window panel is in a fully closed position within the window opening.

15. The weatherstrip sealing system of claim 14, wherein said sealing bulb includes an inwardly extending wiping lip which also engages the window sash when the window panel is in a fully closed position.

16. The weatherstrip sealing system of claim 13, wherein said spacing bracket is substantially U-shaped with said second weatherstrip seal being mounted over the outermost leg of the spacing bracket.

17. The weatherstrip sealing system of claim 16, wherein said second weatherstrip seal includes an S-shaped core which provides first and second U-shaped channels, said first channel being mounted over the outermost leg of said spacing bracket and said second channel being capable of receiving an edge of an inner trim panel, said second channel further including sealing means for sealing the window sash along an inner surface thereof when the window panel is in a fully closed position.

18. A weatherstrip sealing system for sealing a window panel of a vehicle door along a window opening, said window panel including top and side edges and a sash along a lower edge, said weatherstrip sealing system comprising:

means for sealing the window panel along said window opening, said window opening including a first pillar portion integrally connected to a header portion and a second pillar portion which is articulatable along at least one end, said means for sealing the window panel along said window opening including a first weatherstrip having a first section disposed along said first pillar and header and a second section disposed along said second articulatable pillar; and means for automatically latching said window panel and drawing said panel inwardly toward the window opening into enhanced contact with said means for sealing the window panel when said window panel is in a sufficiently closed position within said window opening.

19. The weatherstrip sealing system of claim 18, wherein said first weatherstrip includes a web portion having first and second oppositely extending ribs which seat within a substantially C-shaped channel located along the window opening and a compressible bulb portion having a first arcuate leg extending toward the window opening which provides a reservoir for precluding water from entering the window opening.

20. The weatherstrip sealing system of claim 18, wherein said first weatherstrip includes sealing bulb which extends downwardly from said web, said second sealing bulb including first and second legs extending transversely and oppositely therefrom whereby the first leg engages the window panel when said panel is in an at least partially closed position.

21. The weatherstrip sealing system of claim 20, wherein said means for sealing the window panel further comprises a second weatherstrip disposed inwardly from the first weatherstrip, said second weatherstrip including a substantially U-shaped channel having a first outwardly extending leg which extends from said channel in the direction of said second leg provided on the first weatherstrip, said outwardly extending leg being sufficiently long to be in contact with the second leg of the first weatherstrip.

22. The weatherstrip sealing system of claim 21, further comprising a third weatherstrip disposed along the articulatable pillar between said first and second weatherstrips, said third weatherstrip including first and second legs separated by a web and a third elongated leg extending from said web, said third leg being sufficiently long so as to contact the second weatherstrip regardless of the position of said first articulatable pillar.

23. The weatherstrip sealing system of claim 22, further comprising a fourth weatherstrip disposed along the articulatable pillar, said fourth weatherstrip including a stem which is press fit within a channel provided along the articulatable pillar and a sealing bulb extending from the stem, whereby said sealing bulb serves to provide a seal between the first compressible sealing bulb of the first weatherstrip and a rear quarter window assembly.

24. The weatherstrip sealing system of claim 18, wherein said means for latching said window panel includes at least one latching mechanism actuable to engage a latch extending from the inner surface of said window panel.

25. The weatherstrip sealing system of claim 24, wherein first and second latching mechanisms are provided, said first latching mechanism being disposed along the articulatable pillar to selectively engage a first latch located along the window panel and said second latching mechanism being disposed along the header portion to selectively engage a second latch located along the window panel.

26. The weatherstrip sealing system of claim 21, wherein said first weatherstrip includes a terminal end generally occurring along the belt-line extending from the articulatable pillar which matingly engages a door panel sealing member.

27. The weatherstrip sealing system of claim 26, wherein said terminal end of the first weatherstrip and the door panel sealing member have mating surfaces such that upon the articulation of said articulatable pillar, the mating surfaces come into compressive contact.

28. The weatherstrip sealing system of claim 26, wherein the terminal end of said first weatherstrip and said door panel sealing member are angled slightly open to the path of articulation such that contact increases between the terminal end of said first weatherstrip of said door panel as the pillar articulates inwardly.

29. The weatherstrip sealing system of claim 18, further comprising a vehicle door mirror sealing assembly including a mirror mounting plate extending from the outer panel of the door, said mirror sealing assembly comprising:

an inner trim panel extending from the vehicle door inner panel;

a guide rim bonded along a side edge of the window panel, which includes a plurality of radially extending legs;

a first sealing element extending between the inner trim panel and a first leg of the guide rim; and a second sealing element extending between a second leg of the guide rim and said mirror mounting plate.

30. The weatherstrip sealing system of claim 18, further comprising a belt weatherstrip assembly including a first belt weatherstrip mountable over the outer panel of the vehicle door, an outwardly extending bracket mountable to the inner panel of the vehicle door to allow for sufficient spacing between said inner and outer door panels to host a window regulator, and a second weatherstrip seal mountable over said bracket to provide for sealing along the inner surface of the window panel.

31. The weatherstrip sealing system of claim 30, wherein said first belt weatherstrip includes a core having first and second spaced apart legs to provide a U-shaped channel and a sealing bulb extending from said first leg which provides a seal between the outer door panel and the window sash extending from the window panel when the window panel is in a fully closed position within the window opening.

32. The weatherstrip sealing system of claim 33, wherein said sealing bulb includes an inwardly extending wiping lip which also engages the window sash when the window panel is in a fully closed position.

33. The weatherstrip sealing system of claim 30, wherein said spacing bracket is substantially U-shaped with said second weatherstrip seal being mounted over the outermost leg of the spacing bracket.

34. The weatherstrip sealing system of claim 33, wherein said second weatherstrip seal includes an S-shaped core which provides first and second U-shaped channels, said first channel being mounted over the outermost leg of said spacing bracket and said second channel being capable of receiving an edge of an inner trim panel, said second channel further including sealing means for sealing the window sash along an inner surface thereof when the window panel is in a fully closed position.

* * * * *

UNITED STATES PATENT AND TRADEMARK OFFICE
CERTIFICATE OF CORRECTION

PATENT NO. : 5,651,578

DATED : July 29, 1997

INVENTOR(S) : James E. Mistopoulos et al

It is certified that error appears in the above-identified patent and that said Letters Patent is hereby corrected as shown below:

Col. 1, line 33, "seating" should be --sealing--.

Col. 3, line 54, delete "is".

Col. 5, line 60 "then" should be --than--.

Col. 6, line 5, after "window" insert --is--.

Col. 7, line 34, "dearly" should be --clearly--.

Col. 11, line 11, Claim 20, before "sealing" insert --a--.

Col. 12, line 40, Claim 31, "dosed" should be --closed--.

Col. 12, line 41, Claim 32, "claim 33" should be --claim 31--.

Signed and Sealed this

Twelfth Day of May, 1998

Attest:

BRUCE LEHMAN

Attesting Officer

Commissioner of Patents and Trademarks